United States Patent
Kim et al.

(10) Patent No.: US 8,289,678 B2
(45) Date of Patent: Oct. 16, 2012

(54) SOLID ELECTROLYTIC CAPACITOR AND METHOD FOR PREPARING THE SAME

(75) Inventors: Jae Kwang Kim, Suwon-si (KR); Kwan Hyeong Kim, Suwon-si (KR); Chong Hoon Pak, Suwon-si (KR)

(73) Assignee: Samsung Electro-Mechanics Co., Ltd, Gyunggi-do (KR)

( * ) Notice: Subject to any disclaimer, the term of this patent is extended or adjusted under 35 U.S.C. 154(b) by 626 days.

(21) Appl. No.: 12/191,845

(22) Filed: Aug. 14, 2008

(65) Prior Publication Data

US 2009/0310283 A1     Dec. 17, 2009

(30) Foreign Application Priority Data

Jun. 17, 2008   (KR) ................ 10-2008-0056830

(51) Int. Cl.
  *H01G 9/04* (2006.01)
  *H01G 9/15* (2006.01)
(52) U.S. Cl. ........ 361/538; 361/523; 361/528; 361/532; 361/533; 361/534
(58) Field of Classification Search .......... 361/523, 361/528, 532, 533, 534, 538
See application file for complete search history.

(56) References Cited

U.S. PATENT DOCUMENTS

| | | | | |
|---|---|---|---|---|
| 3,293,507 A | * | 12/1966 | Smith | 361/518 |
| 3,466,508 A | * | 9/1969 | Booe | 361/536 |
| 3,828,227 A | * | 8/1974 | Millard et al. | 361/540 |
| 3,970,903 A | * | 7/1976 | Shirn | 361/533 |
| 4,090,288 A | * | 5/1978 | Thompson et al. | 29/25.03 |
| 4,203,194 A | * | 5/1980 | McGrath | 29/25.03 |
| 4,571,664 A | * | 2/1986 | Hyland | 361/540 |
| 4,660,127 A | * | 4/1987 | Gunter | 361/540 |
| 5,410,445 A | * | 4/1995 | Kanetake | 361/539 |
| 6,238,444 B1 | * | 5/2001 | Cadwallader | 29/25.03 |
| 6,970,345 B2 | * | 11/2005 | Oh et al. | 361/540 |

(Continued)

FOREIGN PATENT DOCUMENTS

JP        06349688        12/1994

(Continued)

OTHER PUBLICATIONS

Chinese Office Action for Application No. 200810135595.6 mailed Mar. 10, 2011.

*Primary Examiner* — Anatoly Vortman
(74) *Attorney, Agent, or Firm* — Lowe, Hauptman, Ham & Berner, LLP

(57) ABSTRACT

The present invention relates to a solid electrolytic capacitor and a method for preparing the same.
There is provided a solid electrolytic capacitor in accordance with the invention including a capacitor element with anode polarity therein and a cathode layer formed on an outer surface thereof; an anode wire with an end portion protruding on one surface of the capacitor element; a cathode lead layer formed on the other surface the capacitor element; a molding part surrounding the capacitor element to expose the protruding end portion of the anode wire and an end portion of the cathode lead layer; and an anode terminal and a cathode terminal formed by a plating layer at both sides of the molding part. It is possible to save preparation cost by simplifying a structure and a preparation process of the solid electrolytic capacitor.

15 Claims, 13 Drawing Sheets

U.S. PATENT DOCUMENTS

| | | | |
|---|---|---|---|
| 7,443,653 B2 * | 10/2008 | Kim et al. | 361/523 |
| 7,570,480 B2 * | 8/2009 | Kim et al. | 361/540 |
| 2003/0218858 A1 * | 11/2003 | Kim et al. | 361/523 |
| 2004/0066607 A1 * | 4/2004 | Edson et al. | 361/528 |
| 2005/0088805 A1 * | 4/2005 | Edson et al. | 361/529 |
| 2006/0260109 A1 * | 11/2006 | Vaisman et al. | 29/25.41 |
| 2006/0262489 A1 * | 11/2006 | Vaisman et al. | 361/540 |
| 2007/0279841 A1 * | 12/2007 | Kim et al. | 361/540 |
| 2008/0019081 A1 * | 1/2008 | Kim et al. | 361/535 |
| 2008/0062617 A1 * | 3/2008 | Edson et al. | 361/529 |
| 2008/0080124 A1 * | 4/2008 | Kim et al. | 361/529 |
| 2009/0154065 A1 * | 6/2009 | Choi et al. | 361/523 |
| 2009/0154066 A1 * | 6/2009 | Choi et al. | 361/523 |
| 2009/0154068 A1 * | 6/2009 | Choi et al. | 361/533 |

FOREIGN PATENT DOCUMENTS

KR    10-2002-0026673 A    4/2002

* cited by examiner

- Prior Art

- Prior Art

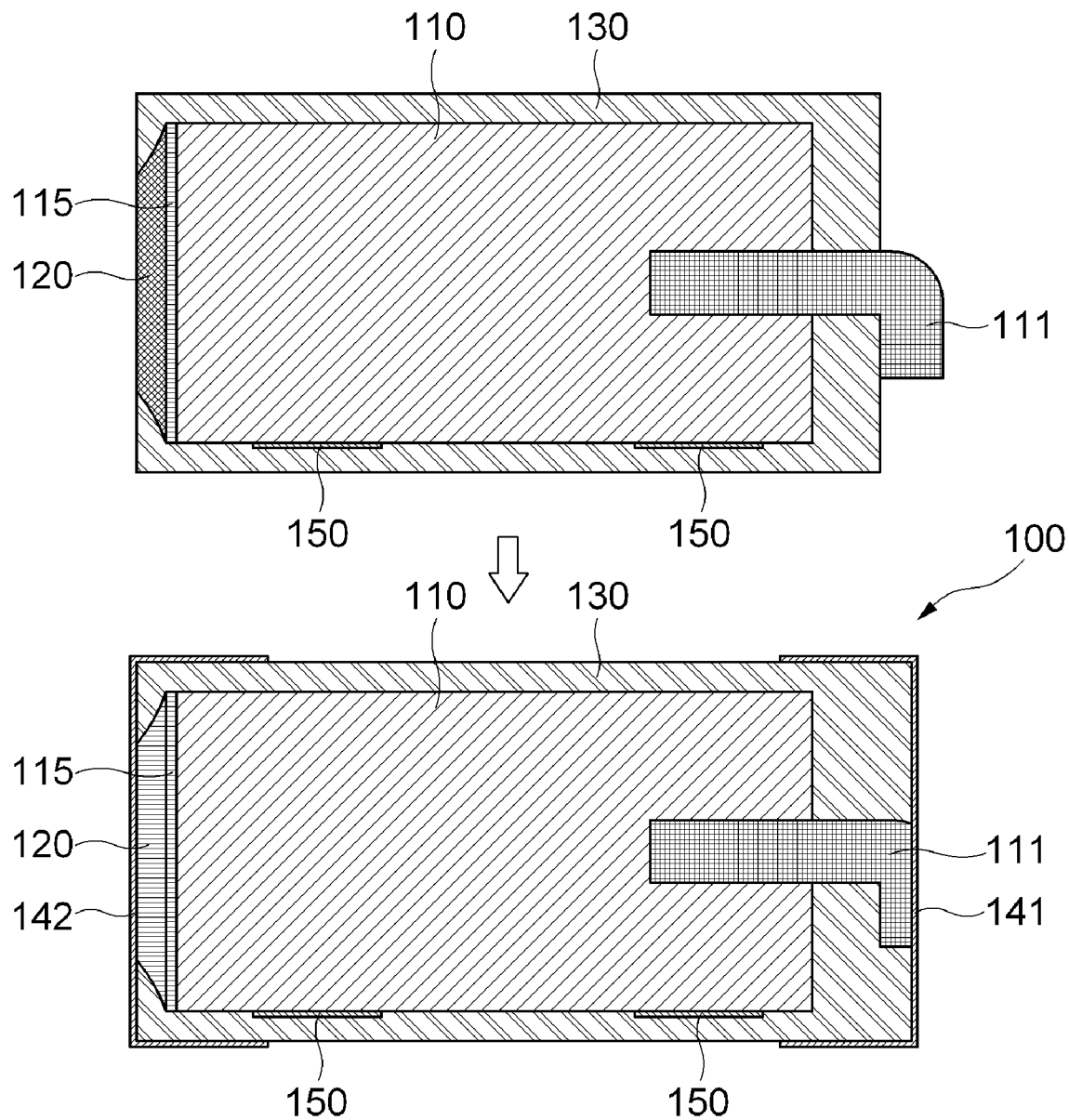

SOLID ELECTROLYTIC CAPACITOR AND METHOD FOR PREPARING THE SAME

CROSS-REFERENCE TO RELATED APPLICATIONS

This application claims the benefit of Korean Patent Application No. 10-2008-0056830 filed with the Korea Intellectual Property Office on Jun. 17, 2008, the disclosure of which is incorporated herein by reference.

BACKGROUND OF THE INVENTION

1. Field of the Invention

The present invention relates to a solid electrolytic capacitor and a method for preparing the same; and more particularly to, a solid electrolytic capacitor which can be prepared without an additional lead frame by forming a cathode lead layer at one side of a capacitor element coupled with an anode wire with a conductive paste and forming an anode and a cathode at both sides of the capacitor element by a coating layer being in contact with the wire and the cathode lead layer, and a method for preparing the same.

2. Description of the Related Art

In general, a solid electrolytic capacitor is one of electronic components used for the purpose of cutting off a D.C. current and passing an AC current in addition to storing electricity and a tantalum capacitor is representatively prepared as the solid electrolytic capacitor.

The tantalum capacitor is used for general industrial equipment and in an application circuit having a low rated voltage range, and particularly, it is primarily used to reduce noise of a circuit or a portable communication apparatus having a defective frequency characteristic.

Such capacitor is prepared by inserting a lead wire into a center portion of a tantalum element or a portion excluding the center portion, or bending the inserted lead wire in an outside of the tantalum element.

A method of leading an anode terminal through spot-welding an anode lead wire and an anode lead frame to each other, and a method of leading an electrode terminal by anode and cathode lead forming after mold packaging are used as a method of assembling the lead frame to the tantalum element.

FIGS. 1 and 2 show a conventional solid electrolytic capacitor. FIG. 1 is a perspective view of the conventional solid electrolytic capacitor and FIG. 2 is a cross-sectional view of the conventional solid electrolytic capacitor.

As shown in the figures, a conventional solid electrolytic capacitor 10 includes a capacitor element 11 made of a dielectric powder material for determining a capacitance and a characteristic of a capacitor, anode and cathode lead frames 13 and 14 connected to the capacitor element 11 so as to easily mount the solid electrolytic capacitor 10 on a printed circuit board (PCB), and an epoxy case 15 molded with an epoxy to protect the capacitor element 11 from an external environment and make a shape of the capacitor element.

At this time, the capacitor element 11 has a rod-shaped anode wire 12 protruding from a portion thereof by a predetermined length.

The anode wire 12 is provided with a press surface 12a having a flat outer surface in order to increase a contact ratio with the anode lead frame 13 and prevent horizontal swing in welding.

Herein, the capacitor element 11 is prepared by forming dielectric powder in a rectangular parallelepiped shape and sintering it in a press process, forming a dielectric oxide coating film on an outer surface of the capacitor element 11 in a transformation process, and forming a manganese dioxide layer made of a solid electrolyte on the outer surface through pyrolysis by immersing the dielectric oxide coating film in a manganese nitrate solution.

A process of connecting the anode and cathode lead frames 13 and 14 to the capacitor element 11 prepared in the above-described manner includes the steps of leading the anode terminal by welding the plate-shaped anode lead frame 13 to the press surface 12a of the rod-shaped anode wire 12 protruding on the one portion of the capacitor element 11 by the predetermined length and leading the cathode terminal with a conductive adhesive applied to an outer surface of the capacitor element 11 or the cathode lead frame 14.

The preparation of the capacitor is completed through a marking process after forming the epoxy case 15 by molding the capacitor element 11 electrically connected to each of the anode and cathode lead frames 13 and 14 with the epoxy.

The conventional solid electrolytic capacitor 10 prepared in the above-described manner has a problem that a capacitance decreases and an impedance increases as the volumetric efficiency of the capacitor element 11 is remarkably lowered in an entire volume including a volume of the epoxy case 15.

In the conventional solid electrolytic capacitor 10, high-temperature heat is generated in the course of welding the anode wire 12 and the anode lead frame 13 directly to each other. AT this time, the generated heat has an influence on the capacitor element 11 through the anode wire 12, thereby damaging the capacitor element 11 vulnerable to heat.

Accordingly, a dielectric substance is broken by a heat shock, resulting in deteriorating a characteristic of a product and causing a failure, thereby increasing preparation cost.

SUMMARY OF THE INVENTION

Accordingly, the present invention is contrived to solve the above-described demerits and problems raised in a conventional solid electrolytic capacitor and a method for preparing the same. An object of the present invention is to provide a solid electrolytic capacitor and a method for preparing the same, which are capable of improving a capacitance in addition to enhancing an electric resistance characteristic by shortening a lead path of a cathode as well as forming a cathode terminal without an additional lead frame through forming an anode terminal and the cathode terminal which are formed by plating on both side surfaces of a molding part surrounding a capacitor element, and an anode wire and a cathode lead layer which are coupled to the capacitor element.

In order to achieve the above-described object of the invention, there is provided a solid electrolytic capacitor including a capacitor element with anode polarity therein and a cathode layer formed on an outer surface thereof; an anode wire with an end portion protruding on one surface of the capacitor element; a cathode lead layer formed on the other surface the capacitor element; a molding part surrounding the capacitor element to expose the protruding end portion of the anode wire and an end portion of the cathode lead layer; and an anode terminal and a cathode terminal formed by a plating layer at both sides of the molding part.

At this time, a conductive shock absorber is interposed between a side surface of the capacitor element and the cathode lead layer on one surface of the capacitor element with the cathode lead layer. The conductive shock absorber serves to solve a contact trouble which may occur between the cathode lead layer and an interface of the capacitor element.

A film-shaped fixing member mainly made of synthetic resins such as polyimide, and the like is tightly coupled onto a bottom surface of the capacitor element and the molding part is formed on an outer circumference surface of the capacitor element in a state that the fixing member is in tight contact with the bottom surface of the capacitor element.

The resin film allows the capacitor element to be fixed to a predetermined position and be supported at the time of arraying the capacitor element.

Meanwhile, the capacitor element has a cathode layer and a cathode reinforcement layer formed on an outer circumference surface of the capacitor element. The cathode layer includes an insulation layer composed of an oxide coating film of tantalum oxide ($Ta_2O_5$) and a solid electrolytic layer made of manganese dioxide ($MnO_2$). The cathode reinforcement layer is formed by sequentially applying a carbon paste and a silver (Ag) paste onto an outer circumference surface of the cathode layer.

At this time, the cathode lead layer formed on the one surface of the capacitor element with the cathode layer may be divided into a dispensing type, a dipping type, and a printing type. The cathode lead layer is composed of a viscous paste containing a conductive material.

The molding part surrounding a surface of the capacitor element, and the anode wire and the cathode lead layer is formed on an outer circumference of the capacitor element. The anode terminal and the cathode terminal formed by the plating layer are formed at both sides of the molding part.

The anode and cathode terminals may be formed by electrolyte plating, electroless plating, dipping, or a paste application method.

At this time, in case that the anode and cathode terminals are formed through the electroless plating, the anode and cathode terminals include an internal plating layer formed by electroless Ni—P plating and an external plating layer formed on the internal plating layer by Cu or Sn plating.

In order to achieve another object of the invention, there is a method for preparing the solid electrolytic capacitor including the steps of: preparing for capacitor elements which include anode polarity therein, a cathode layer formed on a surface thereof, and an anode wire coupled to one end portion thereof; forming a cathode lead layer on the end surface of each of the capacitor element; arraying the capacitor elements on a film-shaped fixing member applied with an adhesive by a predetermined interval; forming a molding part on an outer surface of each of the capacitor elements arrayed on the fixing member by using an epoxy; cutting a molded product to expose the cathode lead layer and an end portion of the anode wire on both sides of the molding part; and forming an anode terminal and a cathode terminal which are formed by a plating layer on both side surfaces of the molded product.

At this time, the method for preparing the solid electrolytic capacitor further includes the step of forming a conductive shock absorber on an interface between a surface of the capacitor element and the cathode lead layer before the step of forming the cathode lead layer on the other end surface of the capacitor element.

The cathode lead layer may be formed by any one of a dispensing type, a dipping type, and a printing type. The cathode lead layer is composed of the viscous paste containing the conductive material.

In the step of arraying the capacitor elements on the film-shaped fixing member, the capacitor elements are adhesively fixed to the fixing member by an adhesive applied to the fixing member. The molding part is formed by applying the epoxy to surround the resin film at the time of forming the molding part on the outer circumference of the capacitor element.

The method for preparing the solid electrolytic capacitor further includes the step of: grinding and trimming a cut surface in order to remove a foreign material existing on the cut surface after the step of cutting the molded product.

In the step of forming the anode terminal and the cathode terminal which are formed by the plating layer on the both side surfaces of the molded part, the anode terminal and the cathode terminal may be formed by the electrolyte plating, the electroless plating, the dipping, or the paste application method.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 4 is a cross-sectional view before forming a cathode base in a capacitor element;

FIG. 5 is a cross-sectional view after forming the cathode base in the capacitor element;

FIG. 6 is a cross-sectional view after forming a molding part in the capacitor element;

FIGS. 13A to 13D are cross-sectional views for each anode wire type applied to a solid electrolytic capacitor in accordance with the invention.

DETAILED DESCRIPTION OF THE PREFERRED EMBODIMENTS

Figure 1:
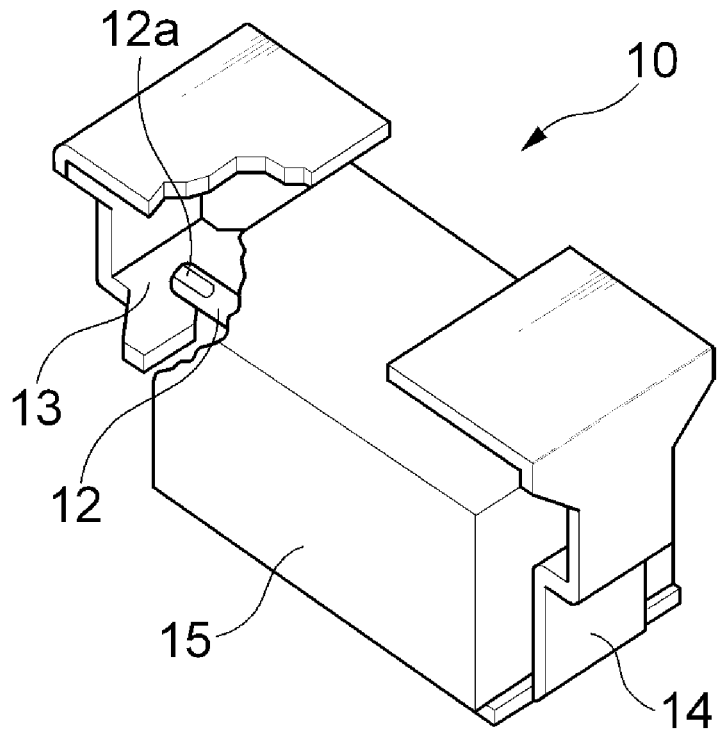
FIG. 1 is a perspective view of a conventional solid electrolytic capacitor.
Figure 2:
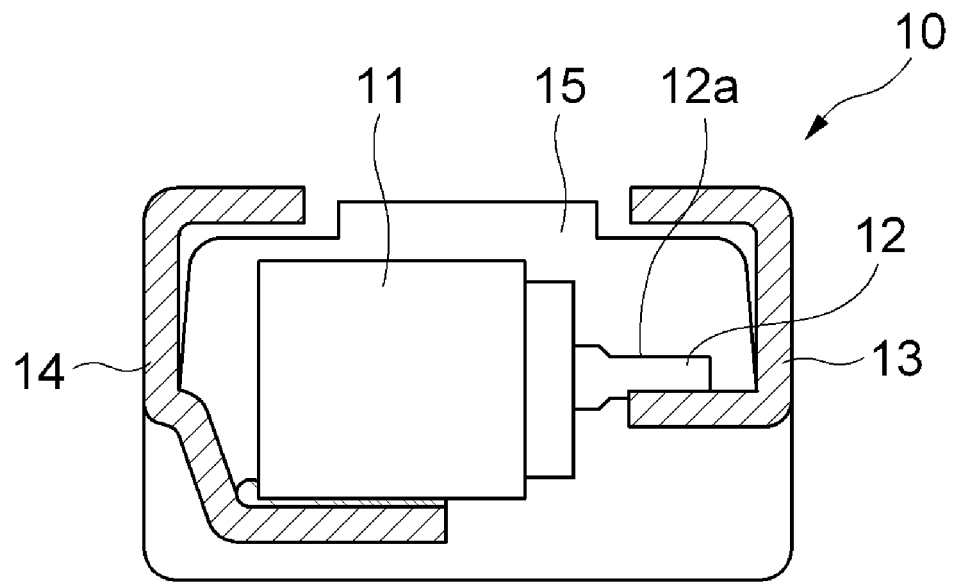
FIG. 2 is a cross-sectional view of a conventional solid electrolytic capacitor.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

A matter relating to advantages including a technical configuration for the above-described object of a solid electrolytic capacitor and a method for preparing the same in accordance with invention will be apparently appreciated from the following detailed description of the embodiments, taken in conjunction with the accompanying drawings.

Figure 3:
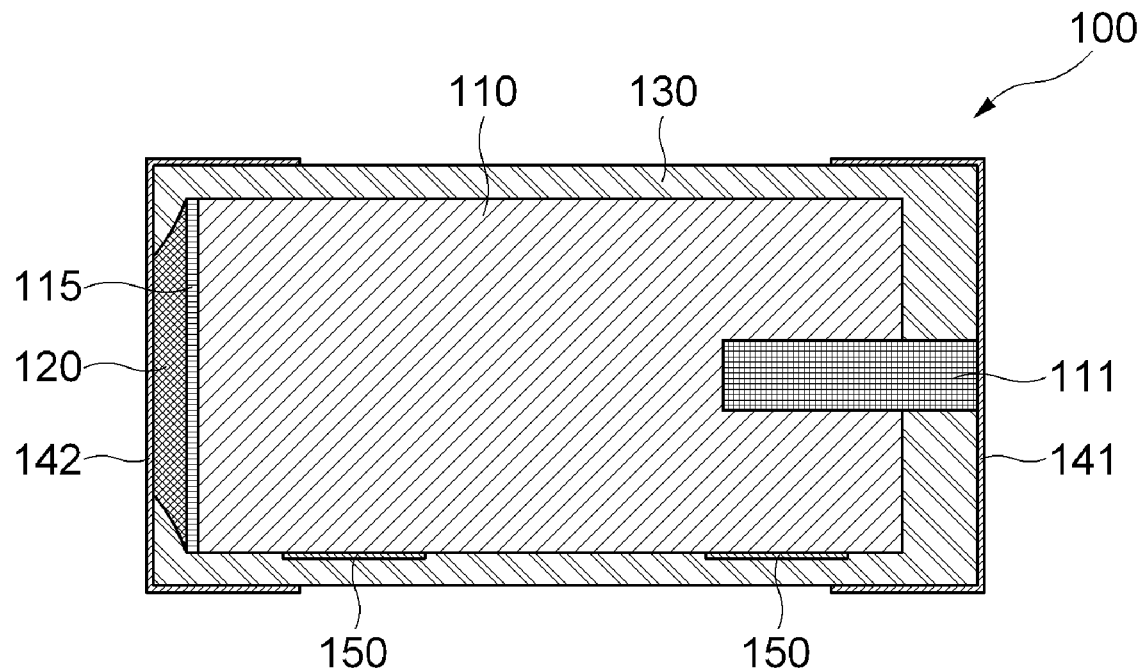
FIG. 3 is a cross-sectional view a solid electrolytic capacitor in accordance with an embodiment of the present invention.
Figure 4:
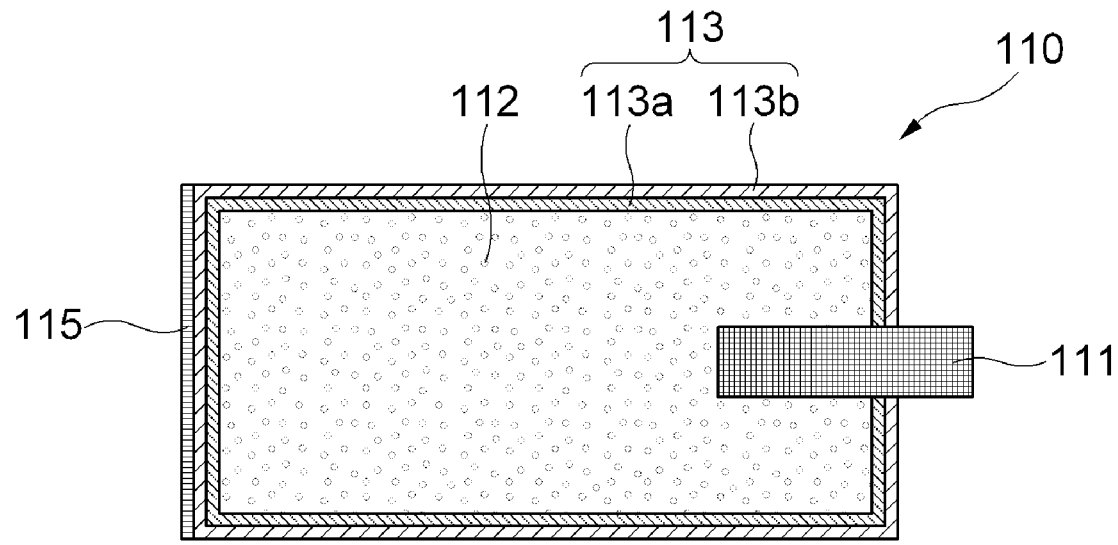
FIGS. 4 to 6 are cross-sectional views illustrating a preparation process of a solid electrolytic capacitor in accordance with the invention.
Figure 5:
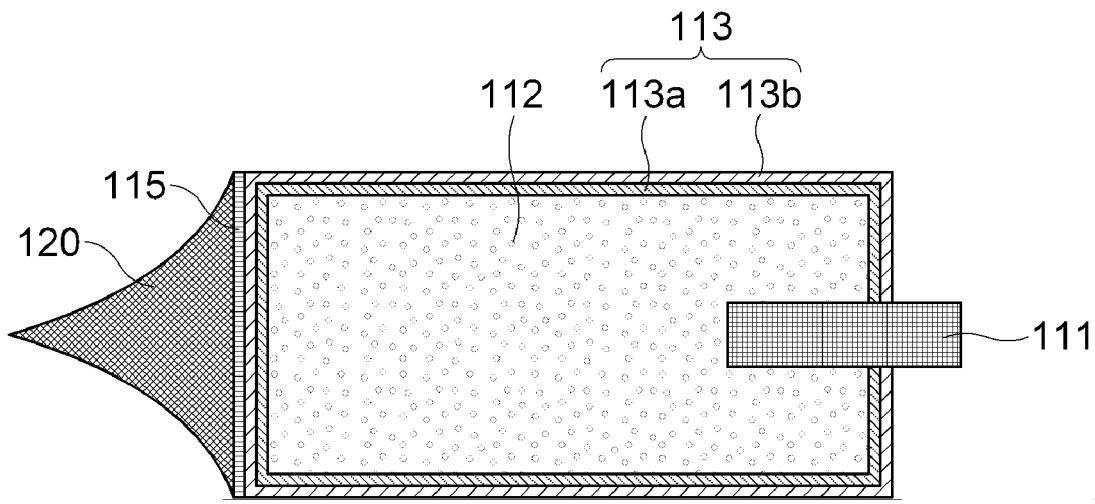
Figure 6:
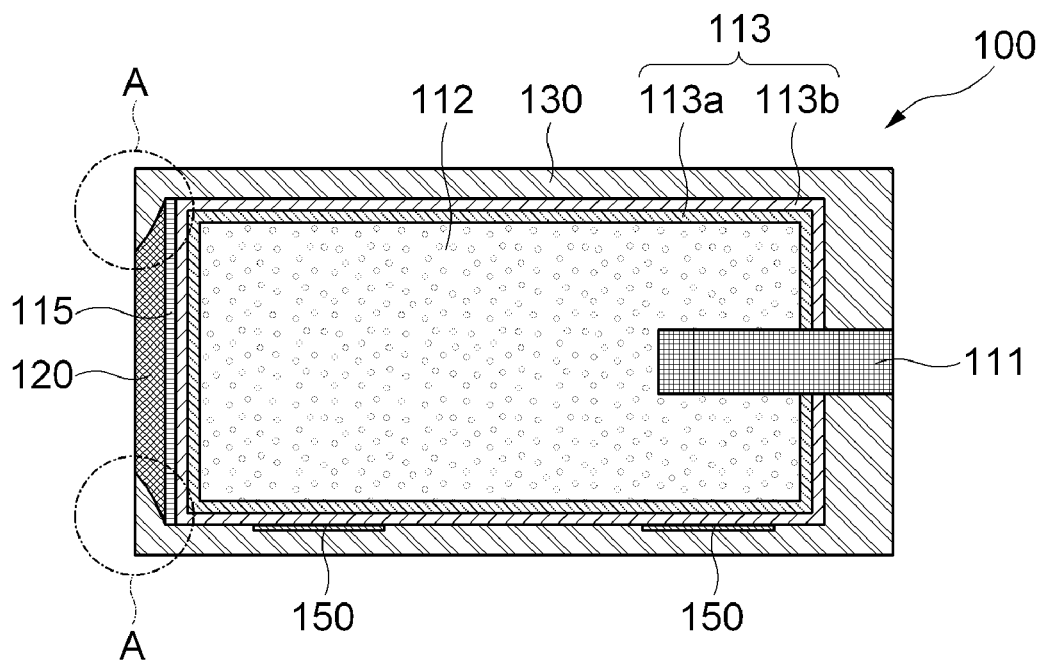

First, FIG. 3 is a cross-sectional view of a solid electrolytic capacitor in accordance with one embodiment of the present invention. FIGS. 4 to 6 are cross-sectional views illustrating a preparation process of a solid electrolytic capacitor in accordance with the present invention. FIG. 4 is a cross-sectional view before forming a cathode base in a capacitor element. FIG. 5 is a cross-sectional view after forming the cathode base in the capacitor element. FIG. 6 is a cross-sectional view after forming a molding part in the condenser element.

As shown in the figures, a solid electrolytic capacitor 100 in accordance with the one embodiment of the invention includes a capacitor element 110 having an anode wire 111 coupled to one end portion thereof, a cathode lead layer 120 formed on the other end surface of the capacitor element 110, a molding part 130 surrounding an outer circumference of the capacitor element 110, and an anode terminal 141 and a cathode terminal 142 formed on both side surfaces of the molding part 130.

The capacitor element 110 has a rectangular parallelepiped shape in which one end portion of the anode wire 111 electrically connected to the anode terminal 141 is coupled to the one end portion of the capacitor element 110 to be exposed.

The capacitor element 110 will be described in more detail. As shown in FIG. 4, the capacitor element 110 a tantalum pellet 112 having anode polarity and a cathode layer (not shown) formed on an outer surface of the capacitor element 110, and a cathode reinforcement layer 113 formed by sequentially applying a carbon paste 113a and a silver paste 113b on an outer circumference surface of the cathode layer.

The tantalum pellet 112 is insulated from the cathode layer formed on the outer surface of the capacitor element 110 by an insulation layer consisting of a dielectric oxide coating film layer. The insulation layer is formed by growing an oxide coating film ($Ta_2O_5$) on a surface of the tantalum pellet 112 through a transformation process using an electrochemical reaction.

At this time, the insulation layer transforms the tantalum pellet 112 into a dielectric body.

Herein, the tantalum pellet 112 is prepared by a mixture of tantalum powder and a binder. After the tantalum powder and the binder are mixed and agitated in a predetermined proportion, and the mixed powder is formed in the rectangular parallelepiped shape by compressing the mixed powder, the tantalum pellet 112 is prepared by sintering the compressed powder under high temperature and high vibration.

The tantalum pellet 112 may be prepared through the sintering by using tantalum (Ta) and niobium (Nb) oxide.

After the nitrate-manganese solution is applied onto the tantalum pellet 112 by immersing the tantalum pellet 112 formed by the insulation layer in a nitrate-manganese solution, a manganese dioxide ($MnO_2$) layer having a cathode is formed on the cathode layer by sintering the tantalum pellet 112 plated with the nitrate-manganese solution.

In the configuration of the capacitor element 110, since it is determined that the insulation layer and the cathode layer are prior art can be sufficiently appreciated by those skilled in the art at the time of preparing the solid electrolytic capacitor adopted in the preset invention, reference numerals and marks in the accompanying drawings for the insulating layer and the cathode layer.

Meanwhile, the cathode reinforcement layer 113 applied with the carbon paste 113a and the silver paste 113b in sequence is formed on the outer surface of the cathode layer. The cathode reinforcement layer 113 facilitates electrical connection to the cathode lead layer 120 for polarity transferring, which is coupled to the cathode reinforcement layer 113 by improving conductivity for polarity of the cathode layer.

Figure 7:
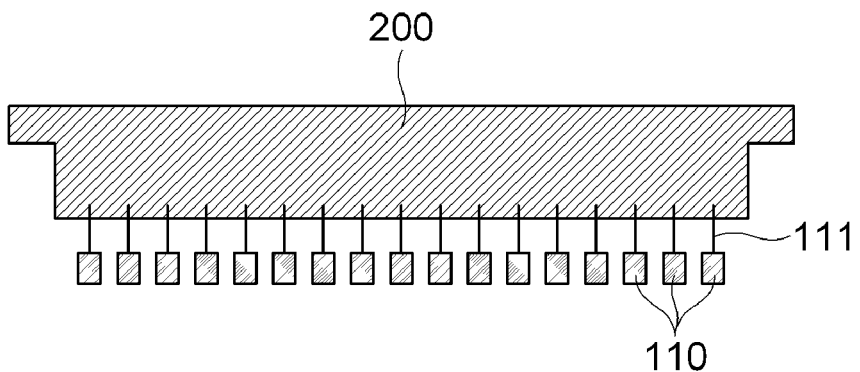
FIG. 7 is a cross-sectional view illustrating a fixing method of a capacitor element adopted in a solid electrolytic capacitor in accordance with the invention.

As shown in FIG. 7, the capacitor element 110 prepared in the above-described manner is coupled to a belt 200 made of aluminum or stainless steel (SUS) by the anode wire 111 for convenience in an assembly process, so that the cathode layer and the cathode reinforcement layer are formed. Then, the following preparation process can be progressed.

The anode wire 111 is coupled to one end portion of the capacitor element 110 and the cathode lead layer 120 is formed in the other end portion of the capacitor element 110 having the cathode reinforcement layer 113 formed on the outer surface thereof, that is, one end portion opposite to the one end portion to which the anode wire 111 is coupled, thereby allowing the cathode terminal to be stably led.

In the present invention, the cathode is lead without a lead frame for leading the cathode terminal. Therefore, since a plating layer for directly leading an electrode cannot be formed from the silver paste layer 113b forming the cathode reinforcement layer 113 of the capacitor element 110, the cathode lead layer 120 using a conductive paste is formed.

It is preferable that the cathode lead layer 120 is composed of the viscous conductive paste such as Au, Pd, Ag, Ni, Cu, or the like. The cathode lead layer 120 is applied onto one surface of the capacitor element 110 and has sufficient strength and hardness through processings such as drying, curing, sintering, and the like.

At this time, the cathode lead layer 120 is cured at approximately 30 to 300° C.

Figure 8A:
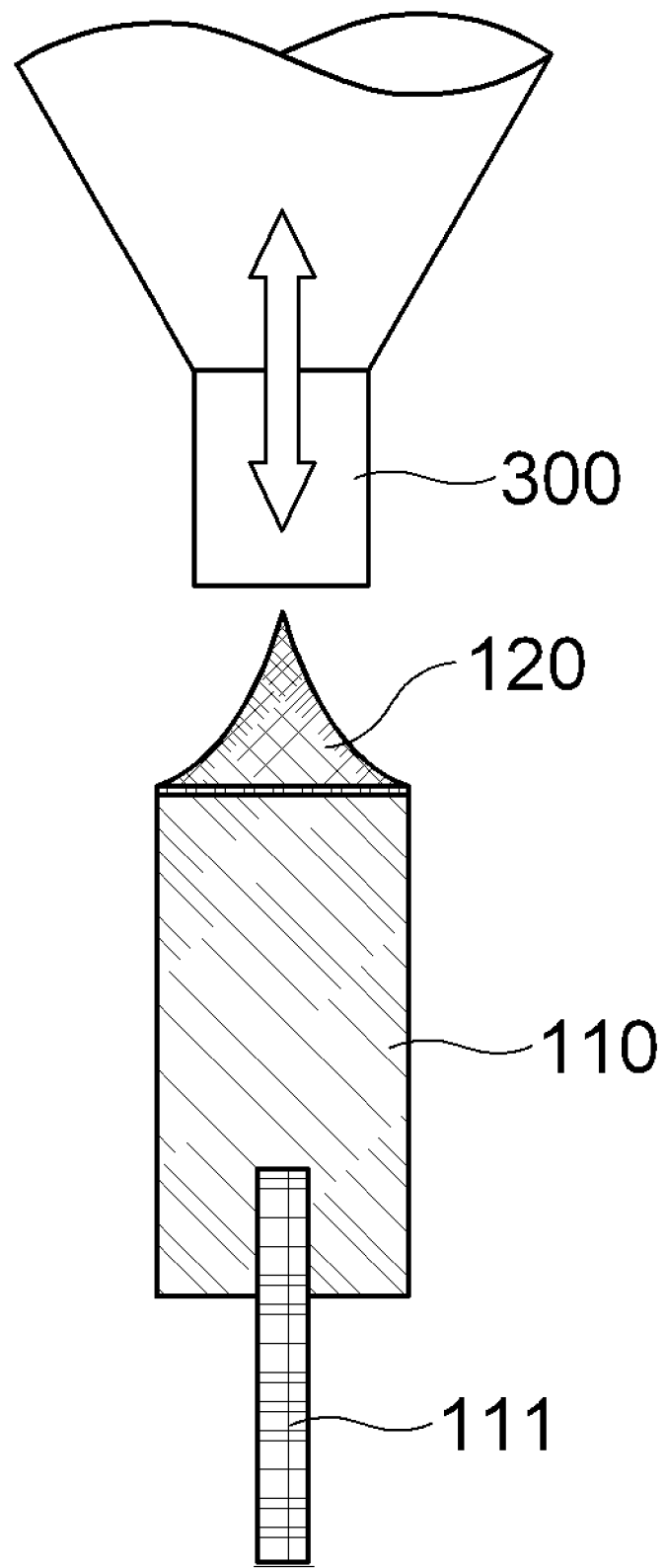
FIGS. 8A to 8C are schematic views for each forming type of a cathode lead layer in a capacitor element adopted in a solid electrolytic capacitor in accordance with the invention.
Figure 8B:
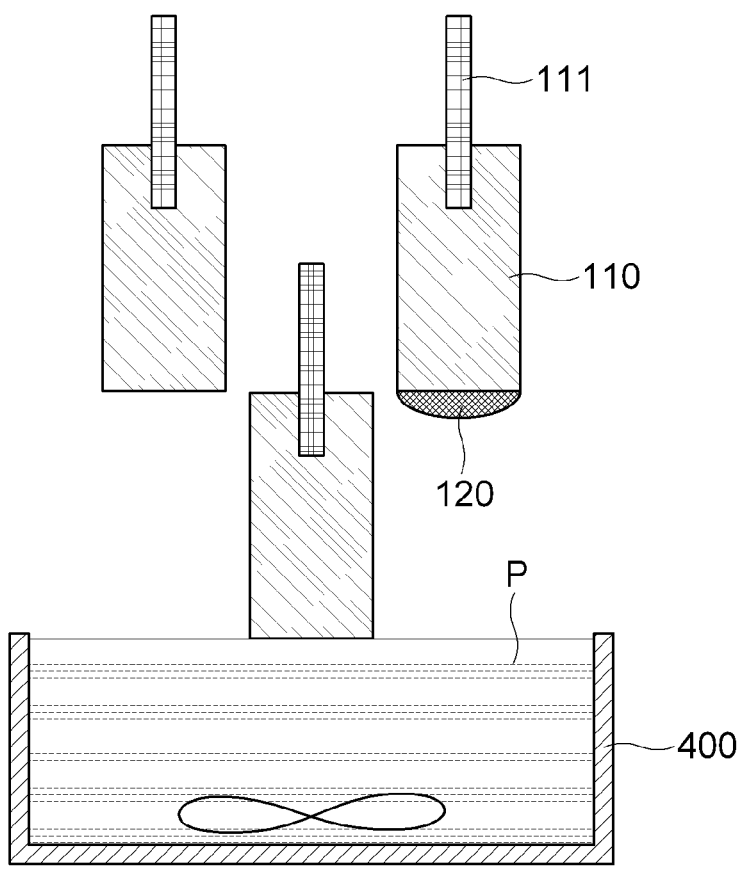
Figure 8C:
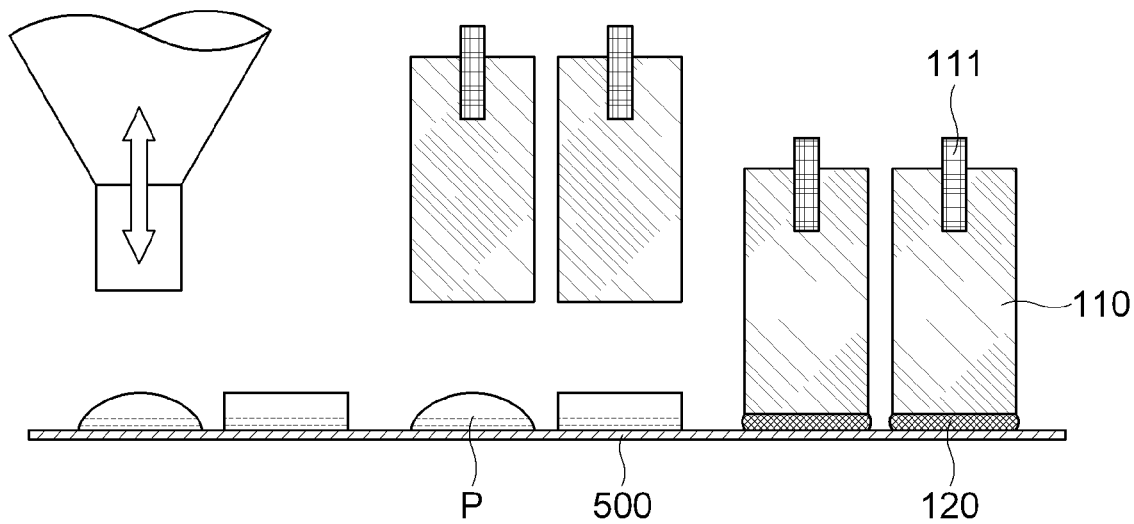

The cathode lead layer 120 may employ a dispensing type (referring to FIG. 8A) using a nozzle 300 on the one surface of the capacitor element 110 to which the anode wire 111 is coupled as shown in FIGS. 8A to 8C, a dipping type (referring to FIG. 8B) in which a predetermined amount of paste P in a bath 400 is attached onto the one surface, and a printing type (referring to FIG. 8C) in which the paste P is printed on a sheet 500 and the printed paste P is attached onto the one surface of the capacitor element 110.

Meanwhile, a conductive shock absorber 115 is interposed between the cathode lead layer 120 and the cathode reinforcement layer 113 on the one surface of the capacitor element 110. The conductive shock absorber 115 serves to protect a surface of the capacitor element 110 on which the cathode lead layer 120 is formed from an external environment.

It is preferable that the conductive shock absorber 115 is made of an epoxy based material having high chemical and mechanical affinities so that the cathode lead layer 120 of the viscous conductive paste can be bonded to the silver paste layer 113b forming an outermost layer of the cathode reinforcement layer 113.

At this time, a reason why the conductive shock absorber 115 is interposed between the cathode reinforcement layer 113 and the cathode lead layer 120 is to solve a contact trouble caused due to the silver paste layer 113b serving as the outermost layer of the cathode reinforcement layer 113 is in direct contact with the conductive paste of the cathode lead layer 120.

The conductive shock absorber 115 may be composed of a lead frame made of steel or a paste material as well as the conductive epoxy based material.

The capacitor element 110 has a fixing member 150 attached to one portion of a bottom surface thereof and the molding part 130 surrounding an outer circumference surface thereof.

The molding part 130 surrounds the outer circumference surface of the capacitor element 110 and a part excluding end surfaces of the anode wire 111 and the cathode lead layer 120 which are exposed to both sides of the capacitor element 110 to protect the capacitor element 110 from the external environment. The molding part 130 is mainly made of an epoxy material.

When the molding part 130 is formed on the outer circumference surface of the capacitor element 110, the molding part 130 may be made of an epoxy for each unit capacitor element 110 and the molding part 130 may collectively formed by arranging the capacitor elements 110 by a predetermined interval.

In case that the molding part 130 is collectively formed on the outer circumference surface of the capacitor element 110, the molding part 130 is formed after arranging the capacitor element 110 by the predetermined interval by using the fixing member 150 attached onto the bottom surface of the capacitor element 110. At this time, the molding part 130 including the fixing member 150 is formed on the outer circumference surface of the capacitor element 110.

The fixing member 150 is composed of a film-shaped fixing member. An array method and a function of the capacitor element 110 using the fixing member 150 will be later described in more detail in the method for preparing the solid electrolytic capacitor.

As shown in a part A of FIG. 6, the molding part 130 surrounds a circumference portion of the cathode lead layer 120 protruding on the one surface of the capacitor element 110, thereby improving the reliability of the molding part 130.

The capacitor element 110 with the molding part 130 has the anode terminal 141 and the cathode terminal 142 the plating layer composed of the plating layer, which are formed on the both sides of the molding part 130. Therefore, the solid electrolytic capacitors 100 of individual products are prepared.

Figure 9A:
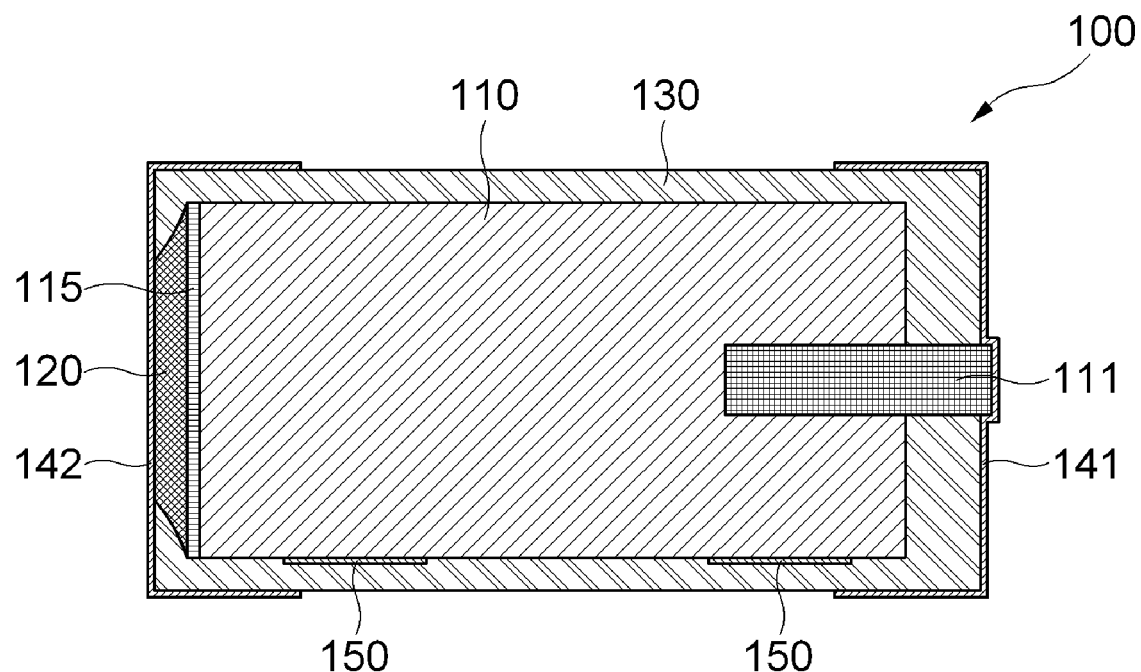
FIGS. 9A to 9C are cross-sectional views for each embodiment of an anode terminal and a cathode terminal of a solid electrolytic capacitor in accordance with the invention.
Figure 9B:
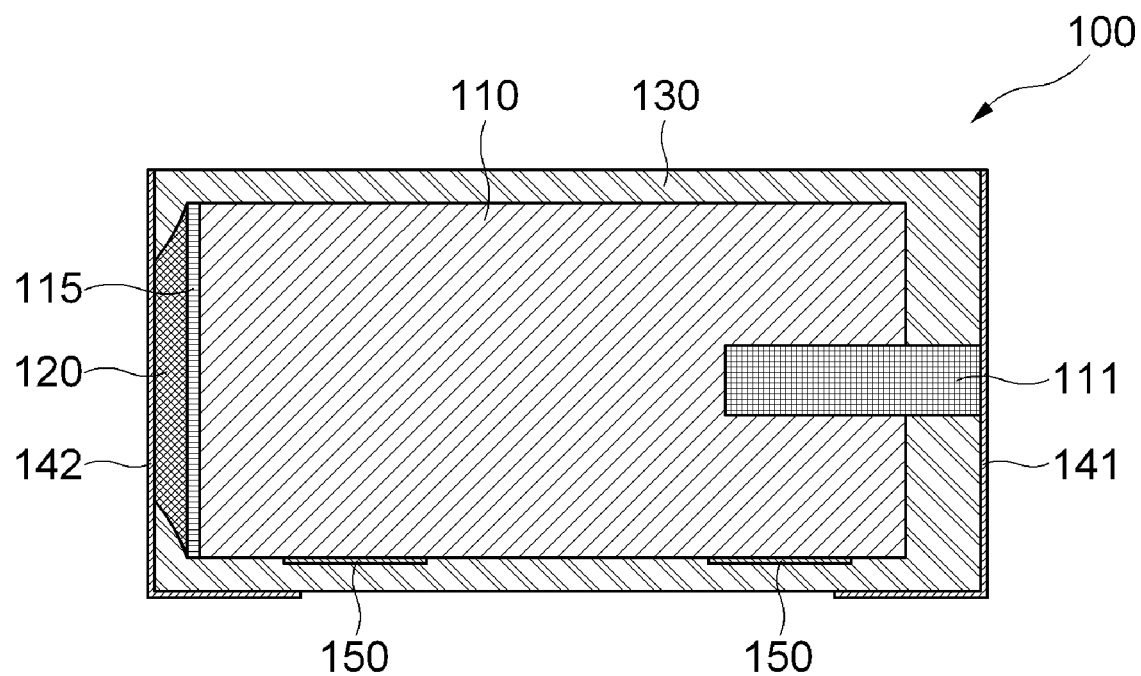
Figure 9C:
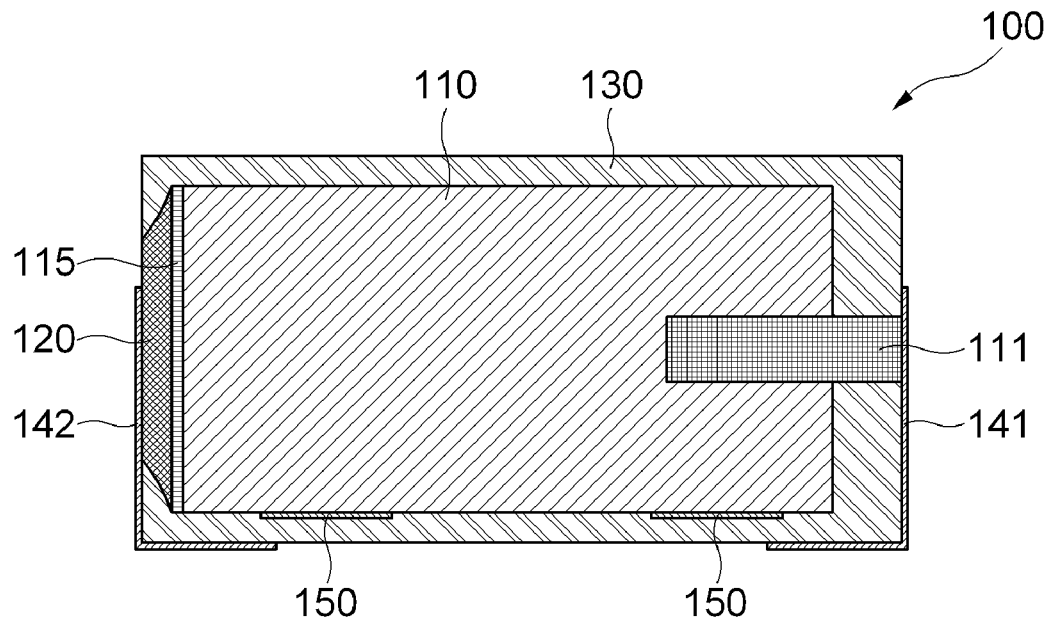

At this time, as shown in FIGS. 9A to 9C, the anode terminal 141 and the cathode terminal 142 are configured by various embodiments.

FIGS. 9A to 9C are cross-sectional views for each embodiment of an anode terminal and a cathode terminal of a solid electrolytic capacitor in accordance with the invention. FIG. 9A shows a structure in which the plating layer extends to the both sides of the molding part 130, and a top surface and a bottom surface adjacent to the both sides of the molding part 130, resulting in forming the anode terminal 141 and the cathode terminal 142. FIGS. 9B and 9C show a structure in which the plating is formed only on the both sides and the bottom surface excluding the top surface of the molding part 130, resulting in forming the anode terminal 141 and the cathode terminal 142.

A reason why the anode terminal 141 and the cathode terminal 142 are not formed on the top surface of the molding part 130 to prevent a short circuit which may occur due to an electrical contact between the anode terminal and the cathode terminal 141 and 142 of the molding part 130, and a bottom surface of a substrate (not shown) mounted with the solid electrolytic capacitor 100 in accordance with the invention in case that the substrate mounted with the solid electrolytic capacitor 100 is stacked.

At this time, in the anode terminal 141 formed by the plating layer being in contact with the anode wire 111, the plating layer including an end portion of the anode wire 111 protruding to an outside of the molding part 130 may be formed in order to increase a contact area with the anode wire 111.

As shown in FIG. 9C, the anode terminal 141 and the cathode terminal 142 are composed of the plating layer including the both sides and the bottom surface of the molding part 130. However, the plating layer formed at the both sides of the molding part 130 is formed only in a part contactable with the anode wire 111 and the cathode lead layer 120 exposed to the molding part 130, thereby minimizing forming portions of the anode terminal 141 and the cathode terminal 142.

Herein, the plating layer for forming the anode terminal 141 and the cathode terminal 142 may be formed by electrolyte plating or electroless plating. In addition, the plating layer for forming the anode terminal 141 and the cathode terminal 142 may be formed by a method such as dipping or paste application in case that the plating is difficult to form and in order to lower the preparation cost of the capacitor.

In case that the plating is formed by the electroless plating, it is preferable that the plating layer is composed of an internal plating layer formed by electroless Ni—P plating and an external plating layer formed by Cu or Sn plating.

Meanwhile, a method for preparing the solid electrolytic capacitor having the above-described structure in accordance with the invention will hereinafter be described in detail with reference to the above-described drawings and drawings to be additionally shown below.

First, as shown in FIGS. 4 to 6 illustrated above, the anode wire 111 is coupled to the one surface of the capacitor element 110 to protrude the one end portion, and the cathode layer and the cathode reinforcement layer 113 are formed on the outer surface of the capacitor element 110.

The cathode lead layer 120 is formed on the other surface of the capacitor element 110 opposite to the one surface coupled with the anode wire 111. As shown in FIGS. 8A to 8C, the cathode lead layer 120 may be formed by the dispensing type, the dipping type, or the printing type. A method for forming the cathode lead layer 120 is not limited to it and may employ various methods in which a cathode can be stably led from the cathode reinforcement layer 113.

It is preferable that the cathode lead layer 120 is made of the viscous conductive paste such as Au, Pd, Ag, Cu, or the like. The cathode lead layer 120 is applied onto one surface of the capacitor element 110 and has the sufficient strength and hardness through processings such as the drying, the curing, the sintering, and the like at 30 to 300° C.

Herein, the conductive shock absorber 115 may be further formed on the one end surface of the capacitor element 110 before forming the cathode lead layer 120 on the one surface of the capacitor element 110. The conductive shock absorber 115 serves to protect the surface of the capacitor element 110 from the external environment and to prevent a contact trouble between the cathode lead layer 120 and the cathode reinforcement layer 113 of the capacitor element 110 occurring on a contact interface between the members.

Figure 10:
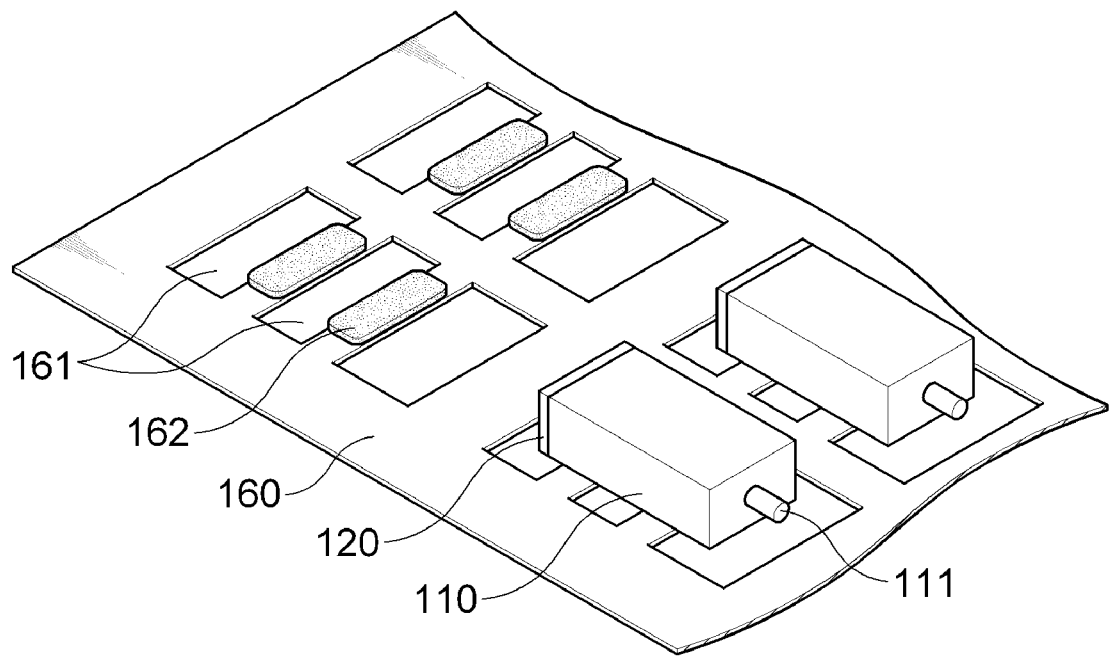
FIG. 10 is a perspective view of arranged capacitor elements employed in a solid electrolytic capacitor in accordance with the invention.

Next, FIG. 10 is a perspective view of arranged capacitor elements employed in the solid electrolytic capacitor in accordance with the invention. As shown in the figure, the capacitor elements 110 having the anode wire 111 coupled to one surface of the capacitor element 110 to protrude on the one surface and the cathode lead layer 120 formed on the other surface thereof are arranged in a fixing member 160.

It is preferable that the fixing member 160 is composed of a thin polyimide film. Through-holes 161 are formed by a predetermined interval by punching.

In the fixing member 160, an adhesive 162 is applied between the through-holes 161, the capacitor element having the anode wire 111 and the cathode lead layer 120 formed at both sides thereof is bonded and fixed to an upper portion of the adhesive 162, whereby a plurality of capacitor element 110 are arranged on the fixing member 160 by a predetermined interval.

At this time, the fixing member 160 has a thermal deformation resistant property and a chemical resistant property, and is formed in a film shape to facilitate a post processing such as cutting. The configuration of the fixing member 160 is not limited to it and may have a thickness of 150 µm or less and be made of a polyimide film or a thin steel material to be minimally transformed at approximately 260° C.

A reason why the capacitor elements 110 by using the film-shaped fixing member 160 is to firmly secure the molding part 130 onto the surface of the capacitor element 110 by preventing lowering of coupling force which may occur between members of different materials, such as the cathode reinforcement layer 113 formed on the surface of the capacitor element 110 and the molding part 130 formed outside thereof, and by improving an affinity therebetween as well as to facilitate the formation of the molding part 130 in outsides of the capacitor elements 110 by arranging the plurality of capacitor elements 110 by the predetermined interval.

Figure 11A:
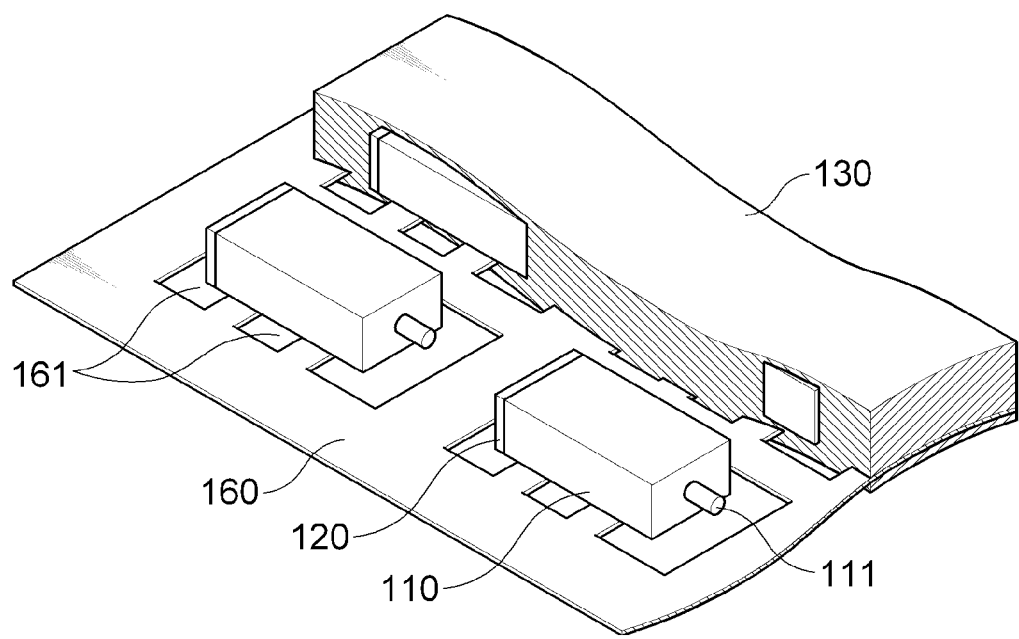
FIGS. 11A and 11B are a perspective view and a cross-sectional view of a molded capacitor element employed in a solid electrolytic capacitor in accordance with the invention.
Figure 11B:
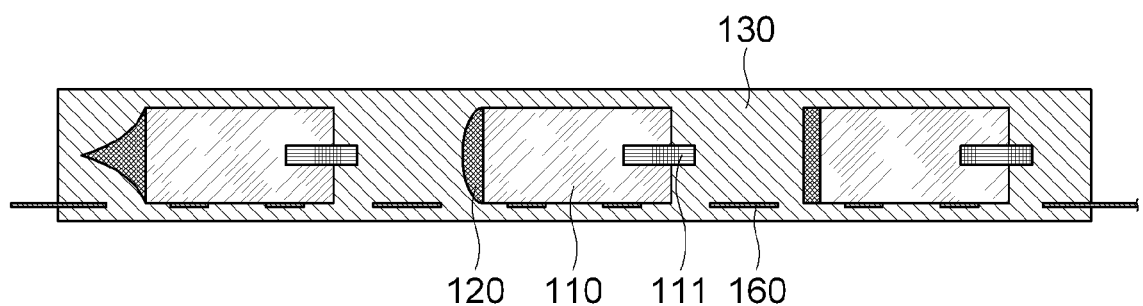
Figure 12:
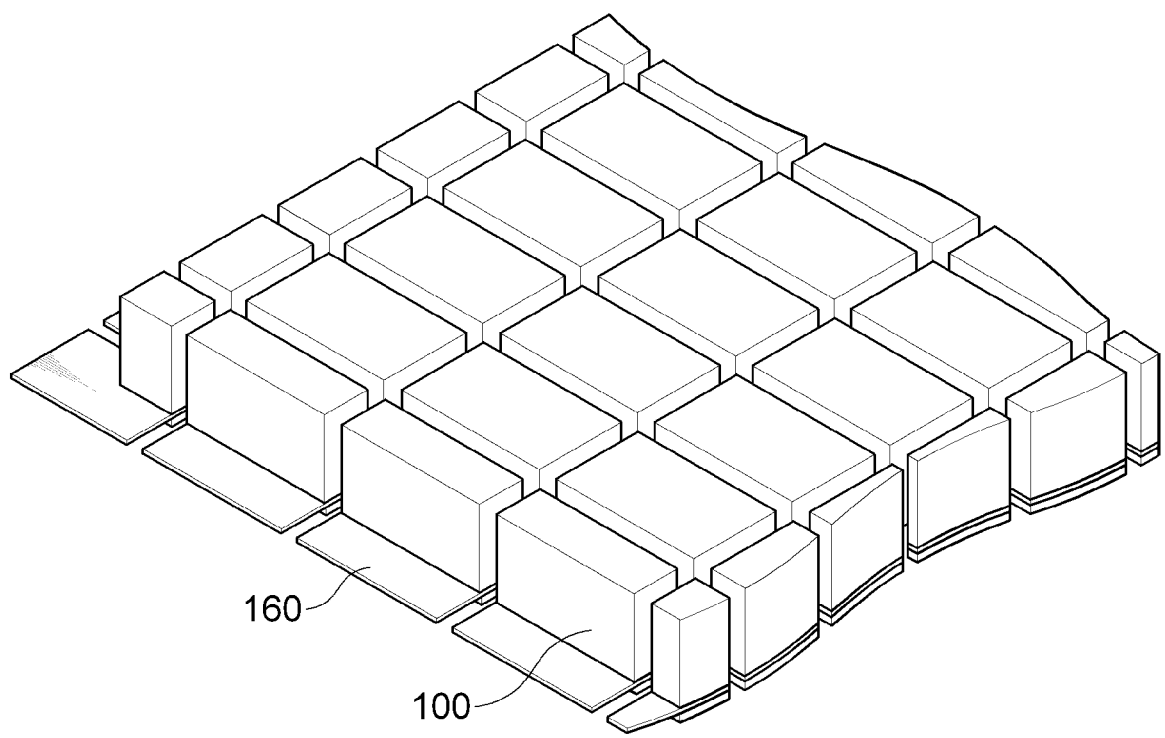
FIG. 12 is a perspective view of a cutting state after molding a solid electrolytic capacitor in accordance with the invention.

As shown in FIGS. 11A and 11B, the capacitor elements 110 arranged in the fixing member 160 by the predetermined interval has the molding part 130 employing an EMC (Epoxy Molding Compound) formed on the outer surface of the capacitor element 110 including the fixing member 160.

As shown in FIG. 11B, the molding part 130 is wholly molded by including the outer circumference surfaces of the capacitor elements 110 arranged by the predetermined interval with being attached to the fixing member 160, and the fixing member 160.

After then, the capacitor elements 110 with the molding part 130 are separately cut and are divided into the unit solid electrolytic capacitor 100.

The solid electrolytic capacitor 100 with the molding part 130 can be cut by dicing using a blade or laser cutting using a laser. A cut surface of the cut unit capacitor is grinded or trimmed.

A foreign material existing on a target surface for forming the plating layer is removed by grinding and trimming both side surfaces of the capacitor element 110. The anode terminal 141 and the cathode terminal 142 are formed by plating grinding and trimming completed products.

At this time, electrical conductivity of the anode wire 111 having an end surface exposed on the molding part 130 can be improved by removing a transformation coating film on its surface by using the laser.

Since the end portion of the anode wire 111 is exposed to an outside of the molding part 130 as shown in FIG. 9A, it is possible to improve an electrical characteristic by increasing a contact area between the anode wire 111 and the anode terminal 141 formed by the plating layer.

At this time, the plating for forming the anode terminal 141 and the cathode terminal 142 may be formed by the electrolyte plating or the electroless plating as described above or may be formed by dipping and applying the paste on the both side surfaces of the molding part 130.

Next, FIGS. 13A to 13D are cross-sectional views for each anode wire type applied to the solid electrolytic capacitor in accordance with the invention. As shown in the figures, a shape of the end portion of the anode wire 111 is transformed in various forms in order to increase the contact area between the anode wire 111 and the cathode terminal 142.

Figure 13A:
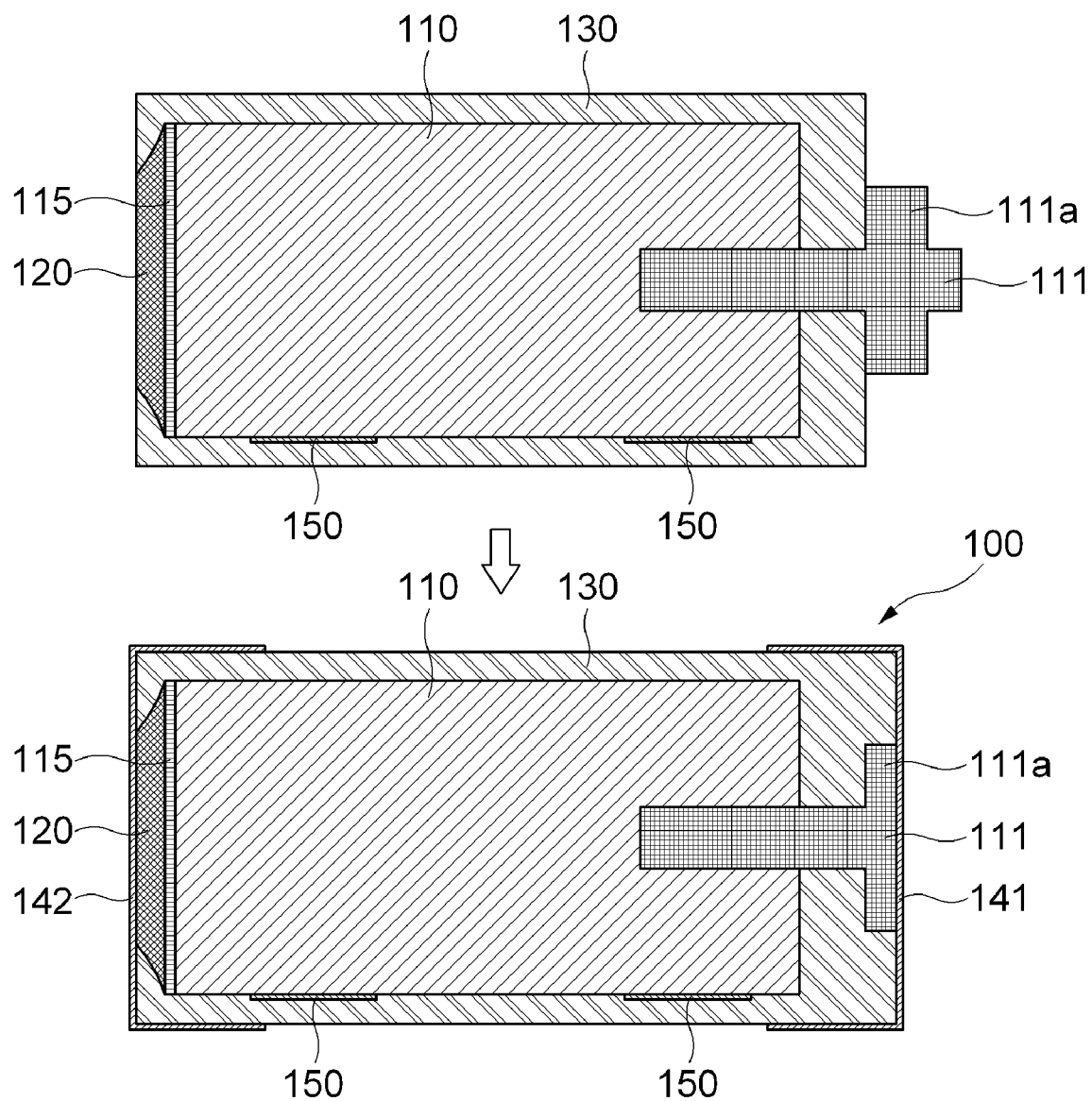

In FIG. 13A, after an auxiliary wire 111a is adhesively fixed to be perpendicular to the anode wire 111 by welding, the molding part 130 is formed on the outer surface of the capacitor element 110, the anode terminal 141 is formed at the end portion of the molding part 130 by the plating layer being in contact with the auxiliary wire 111a protruding to the outside of the end portion of the molding part.

Figure 13B:
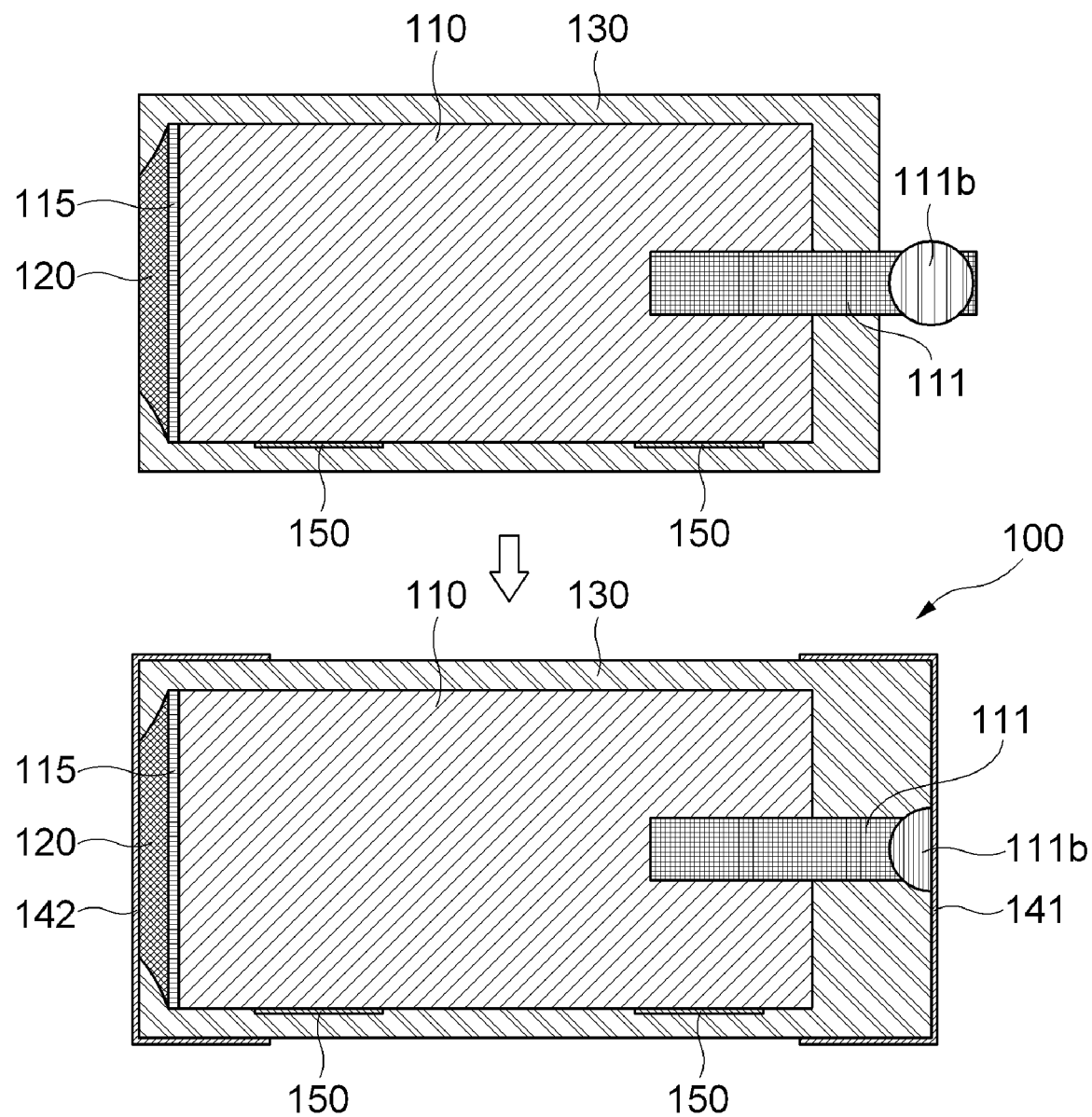
Figure 13D:
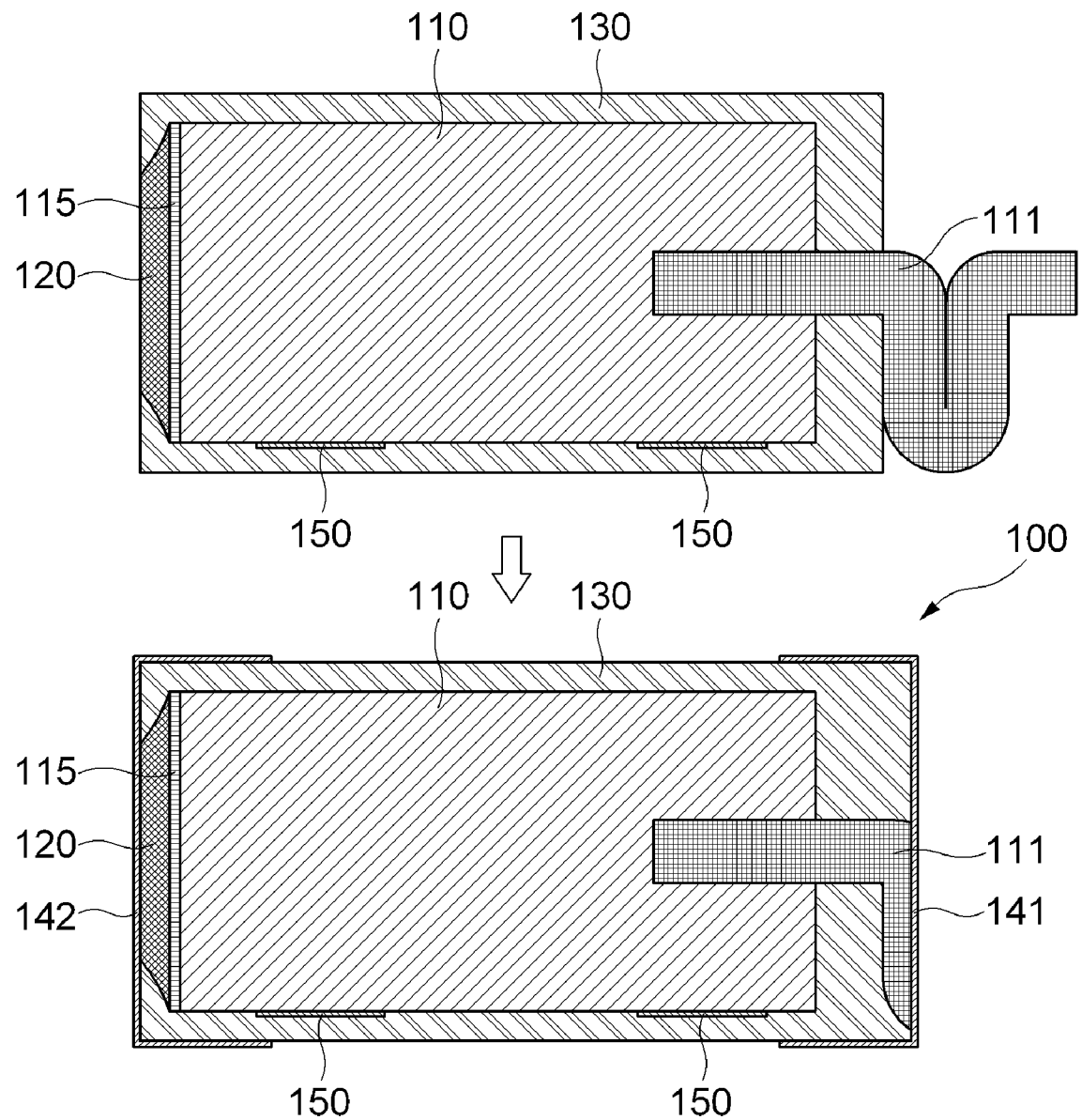

In FIG. 13B, the anode terminal 141 is formed by contacting a conductive paste 111b with the plating layer after applying the conductive paste 111b onto the end portion of the anode wire 111 and curing it. In FIGS. 13C and 13D, the anode wire is bent in one direction to allow the anode terminal 141 formed by the plating layer to be in contact with the bent portion.

It is possible to secure reliability of the formation of the anode terminal 141 by increasing the contact area between the anode wire 111 and the anode terminal 141 formed by the plating layer through transforming the anode wire 111 in various forms as described above.

As described above, the solid electrolytic capacitor and the method for preparing the same in accordance with the invention, it is possible to save preparation cost by simplifying a structure and a preparation process of the solid electrolytic capacitor.

In the solid electrolytic capacitor and the method for preparing the same in accordance with the invention, it is possible to downsize the solid electrolytic capacitor and maximize.

In the solid electrolytic capacitor and the method for preparing the same in accordance with the invention, it is possible to realize a low ESR (Equivalent Series Resistance characteristic of the solid electrolytic capacitor.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A solid electrolytic capacitor, comprising:
    a capacitor element with anode polarity therein, the capacitor element comprising a cathode layer and a cathode reinforcement layer formed on an outer surface of the cathode layer;
    an anode wire having an end portion protruding on a first side surface of the capacitor element;
    a cathode lead layer formed on a second side surface of the capacitor element;
    a conductive shock absorber interposed between the second side surface of the capacitor element and the cathode lead layer;
    a molding part surrounding the capacitor element to expose the protruding end portion of the anode wire and to expose an end portion of the cathode lead layer;
    an anode terminal and a cathode terminal formed by at least one plating layer at both sides of the molding part; and
    a film-shaped fixing member tightly coupled onto a bottom surface of the capacitor element, wherein
    the conductive shock absorber comprises a lead frame made of steel or a lead frame made of a paste, and
    the molding part is formed on an outer circumference surface of the capacitor element including the fixing member.

2. The solid electrolytic capacitor of claim 1, wherein the cathode layer includes an insulation layer comprising an oxide coating film of tantalum oxide ($Ta_2O_5$) and a solid electrolytic layer made of manganese dioxide ($MnO_2$).

3. The solid electrolytic capacitor of claim 1, wherein the cathode lead layer comprises a viscous paste containing a conductive material.

4. The solid electrolytic capacitor of claim 1, wherein the cathode lead layer comprises a viscous conductive paste made of any one selected from the group consisting of Au, Pd, Ag, and Cu.

5. The solid electrolytic capacitor of claim 1, wherein the molding part surrounds a periphery portion of the cathode lead layer to expose the end portion of the cathode lead layer.

6. The solid electrolytic capacitor of claim 1, wherein the at least one plating layer of the anode and cathode terminals comprises:
   an internal plating layer formed by electroless Ni—P plating; and
   an external plating layer formed on the internal plating layer by Cu or Sn plating.

7. The solid electrolytic capacitor of claim 1, wherein the at least one plating layer of the anode and cathode terminals comprises a plurality of plating layers extending to side surfaces, a top surface, and a bottom surface of the molding part, the top and bottom surfaces being adjacent to the side surfaces.

8. The solid electrolytic capacitor of claim 1, wherein the at least one plating layer of the anode and cathode terminals comprises a plurality of plating layers formed only on side surfaces and a bottom surface of the molding part, but not on a top surface of the molding part.

9. The solid electrolytic capacitor of claim 1, wherein the film-shaped fixing member is a thin polyimide film or thin steel which is separately adhered to the bottom surface of the capacitor element at a predetermined interval.

10. The solid electrolytic capacitor of claim 1, wherein the end portion of the anode wire protrudes to an outside of the molding part.

11. The solid electrolytic capacitor of claim 1, wherein the conductive shock absorber is configured to protect the second side surface of the capacitor element from an external environment.

12. The solid electrolytic capacitor of claim 1, wherein the conductive shock absorber is configured to prevent a contact trouble between the second side surface of the capacitor element and the cathode lead layer.

13. The solid electrolytic capacitor of claim 1, wherein the cathode reinforcement layer comprises a carbon paste and a silver (Ag) paste sequentially formed on the cathode layer.

14. A solid electrolytic capacitor, comprising:
   a capacitor element with anode polarity therein, the capacitor element comprising a cathode layer and a cathode reinforcement layer formed on an outer surface of the cathode layer;
   an anode wire having an end portion protruding on a first side surface of the capacitor element;
   a cathode lead layer formed on a second side surface of the capacitor element;
   a conductive shock absorber interposed between the second side surface of the capacitor element and the cathode lead layer and the cathode lead layer;
   a molding part surrounding the capacitor element to expose the protruding end portion of the anode wire and to expose an end portion of the cathode lead layer; and
   an anode terminal and a cathode terminal formed by at least one plating layer at both sides of the molding part, wherein
   the cathode layer includes an insulation layer comprising an oxide coating film of tantalum oxide ($Ta_2O_5$) and a solid electrolytic layer made of manganese dioxide ($MnO_2$).

15. A solid electrolytic capacitor, comprising:
   a capacitor element with anode polarity therein, the capacitor element comprising a cathode layer and a cathode reinforcement layer formed on an outer surface of the cathode layer;
   an anode wire having an end portion protruding on a first side surface of the capacitor element;
   a cathode lead layer formed on a second side surface of the capacitor element;
   a conductive shock absorber interposed between the second side surface of the capacitor element and the cathode lead layer and the cathode lead layer;
   a molding part surrounding the capacitor element to expose the protruding end portion of the anode wire and to expose an end portion of the cathode lead layer; and
   an anode terminal and a cathode terminal formed by at least one plating layer at both sides of the molding part, wherein
   the cathode reinforcement layer comprises a carbon paste and a silver (Ag) paste sequentially formed on the cathode layer.

* * * * *